United States Patent
Schmitt et al.

[11] 3,894,369
[45] July 15, 1975

[54] BUILDING STRUCTURES

[76] Inventors: Robert F. Schmitt, 399 Crossbrook Dr.; Edward A. Schmitt, 690 Wyleswood Dr., both of Berea, Ohio 44017

[22] Filed: Feb. 8, 1974

[21] Appl. No.: 440,720

[52] U.S. Cl. .................. 52/173; 52/234; 126/270; 237/1 A
[51] Int. Cl.² .................. E04H 13/00; F03G 7/02
[58] Field of Search ...... 52/173, 234; 126/270, 271; 237/1 A; 165/1

[56] References Cited
UNITED STATES PATENTS
3,450,192  6/1969  Hay.............................. 126/270 X OTHER PUBLICATIONS
Products & Practice, The Architectural Forum, Aug. 1943, pp. 6, 7, 8.
"Sun at Work," Harry Thomason, 1960–1961, pp. 1, 2, 5, 6, 7 & 8 relied on.

*Primary Examiner*—J. Karl Bell
*Attorney, Agent, or Firm*—Donnelly, Maky, Renner & Otto

[57] ABSTRACT

A building structure in which most or all of the exterior glass area is exposed to an outdoor area which is enclosed during cold weather and has a transparent roof permitting passage of solar energy therethrough for heating the enclosed area and thereby minimizing the loss of heat through the exterior glass area without sacrifice to natural lighting or outdoor viewing. A fire in the enclosed area is readily visible from virtually every room in the structure and may be used to provide supplemental heat to the enclosed area at night or during poor solar days in cold weather. Sliding glass doors and the like may also provide easy access to the enclosed area from virtually every room in the structure, and because of the solar heating effects on the enclosed area, it may be used for various outdoor patio activities substantially the year around.

15 Claims, 4 Drawing Figures

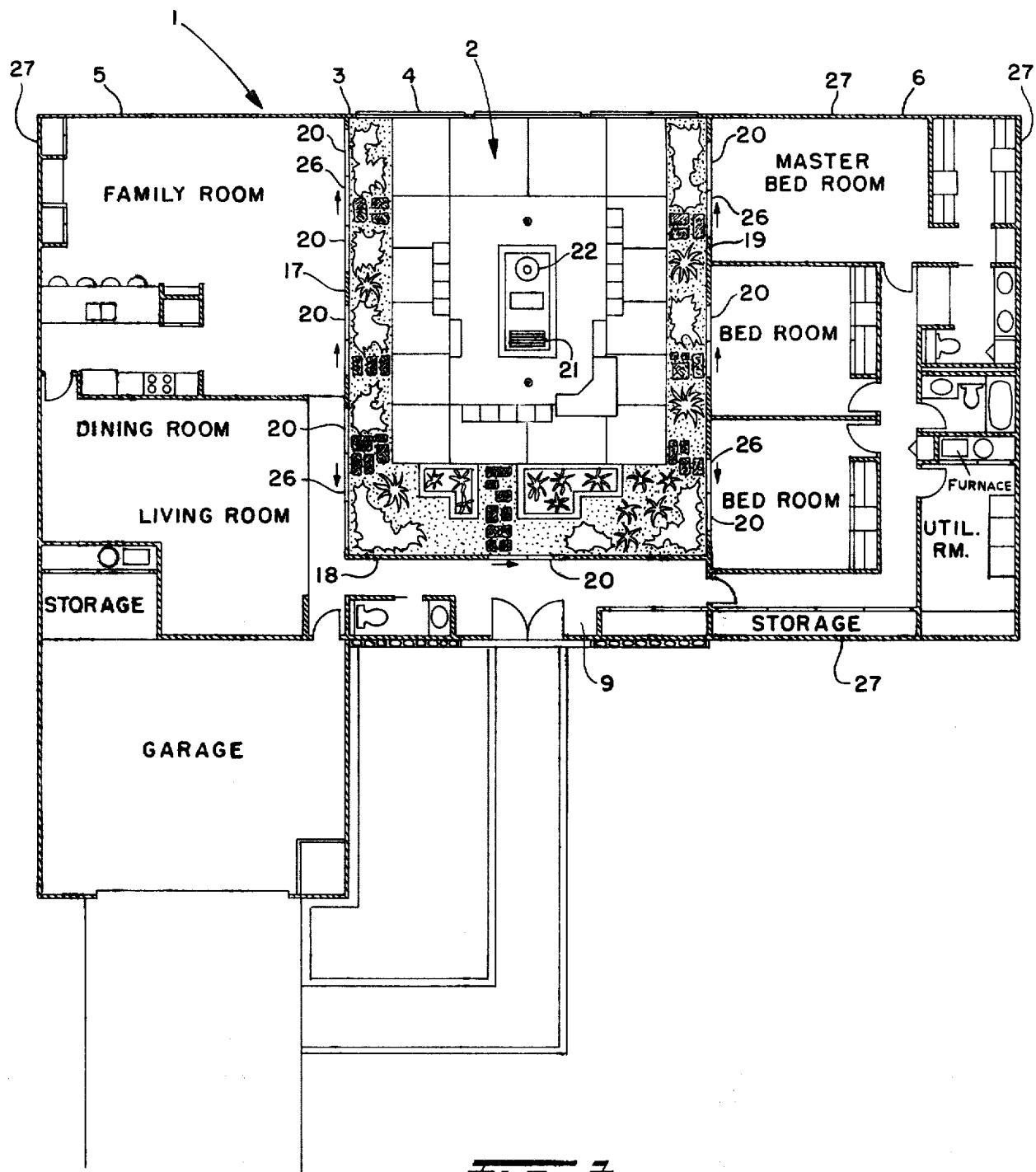

BUILDING STRUCTURES

BACKGROUND OF THE INVENTION

This invention relates generally as indicated to building structures, and in particular, to building structures of a unique design including solar heated patio areas which may be effectively used both to substantially reduce the amount of heat loss from the interior of the structures during cold weather, and to provide an outdoor atmosphere having both functional and amenity values the year around which may be made readily accessible and visible from virtually every room.

Much work has of course already been done to make use of solar energy to assist in heating houses and other building structures. However, heretofore such efforts have primarily been directed toward transferring or storing solar heat for use in heating the structures or water with little or no effort having been made to obtain other desirable benefits from the solar energy, for example, to permit greater use of window and patio areas to create an atmosphere of outdoor living year-round without incurring the large amounts of heat loss which would normally occur through the windows during cold weather.

While it is possible with existing materials and knowledge to reduce energy consumption for heating and cooling new homes and other structures in the order of 50% as compared to typical heat loss characteristics of homes built in the past, nevertheless a major source of heat loss from any such structures has been through the exterior glass area even when insulating glass is used. For instance, at a 75°F. temperature difference between the interior and exterior, 1 square foot of ¼ inch air space insulating glass loses approximately 48 BTU per hour not counting the infiltration loss characteristics of the window, which is in the order of 10 times more than the heat loss than through a well insulated opaque wall. Such high heat loss through the exterior glass area is of more concern now particularly in view of the permanent fossil fuel shortage and corresponding higher costs of procuring the dwindling supply of such fuel.

SUMMARY OF THE INVENTION

With the foregoing in mind, it is a principal object of this invention to provide a building structure which utilizes solar energy to substantially conserve on the fuel required to heat the structure and also obtains other functional and amenity benefits therefrom.

Another object is to provide such a building structure which substantially reduces the heat loss through the exterior glass area and in many instances provides a heat gain through the exterior glass area even when there is a substantial temperature difference between the interior and exterior of the structure.

Still another object is to provide such a building structure which permits substantial use of exterior glass area without incurring the large amounts of heat loss which would normally occur therethrough.

Yet another object is to provide such a building structure in which substantial portions of the interior space are exposed to a solar heated patio area to substantially reduce the amount of heat loss from the interior space and also provide an open, outdoor environment the year around in cold climates.

Still another object is to provide such a building structure in which the solar heating effects on the structure provides protection against freezing of the mechanical heating and cooling systems for the structure and maintains tolerable room temperatures even during fuel and energy interruptions in cold weather.

These and other objects of the present invention may be achieved by providing a building structure in which most or all of the exterior glass area is exposed to an outdoor area that is enclosed under a transparent roof with insulated wall enclosure during cold weather to create a "greenhouse" effect which substantially reduces or completely eliminates the loss of heat through the exterior glass area depending on the temperature differential between the enclosed outdoor area and the interior space exposed to the outdoor area. If the temperature of the enclosed solar heated area is only slightly less than the interior temperature, there will be very little heat loss through the exterior glass area, whereas if the temperature of the enclosed solar heated area is higher than the interior temperature an interior heat temperature gain will result by the heat passing directly through the exterior glass area or by opening the glass area to permit transmission of the heat by convection.

By eliminating most or all of the exterior glass area along the exterior walls of the structure not exposed to the enclosed solar heated area, the major source of heat loss through the building structure is eliminated with little or no sacrifice to natural lighting and outdoor viewing. In fact, the enclosed outdoor area provides an excellent patio setting which may be used for outdoor patio activities and to grow flowers and other plants the year around in colder climates because of the solar heating effects on the area.

Supplemental heating for the entire structure may also be obtained from the patio area on cold nights or during poor solar days by providing a fire in a fireplace and/or potbellied stove in the patio area. In addition to the heating effects, a patio fire may be used for outdoor cooking, and there are also the psychological benefits obtained from the patio fire which is visible from virtually every room in the house. A patio fire also eliminates the heat loss from a fire in a conventional interior fireplace and its unbalancing effect on the house heating system, and a patio fire is also much safer since it is not near any combustible materials.

During warm weather, the solar heating effects on the patio area may be minimized by opening large glass doors or windows in the insulated wall of the patio area and large louvers in the gable ends of the glass covered roof area and vented openings at the bottom of the front roof slope glass area which create a chimney effect inside the patio area for continuously removing excess heat in the summer. Insulating panels may also be installed over the patio glass areas to assist in keeping the patio area cool in warm weather and also minimize heat loss through the patio glass area during cold weather when the sun is not shining.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is an enlarged horizontal section through the building structure of FIG. 1 taken on the plane of the line 3—3 thereof.

DESCRIPTION OF THE PREFERRED EMBODIMENT

Referring now in detail to the drawings, one type of building structure, a single floor house, is shown incorporating the various novel aspects of the present invention. However, it will be apparent that the same design principles are applicable to a wide variety of different house plans, and also to other building structures which may include more than one story.

Figure 1:
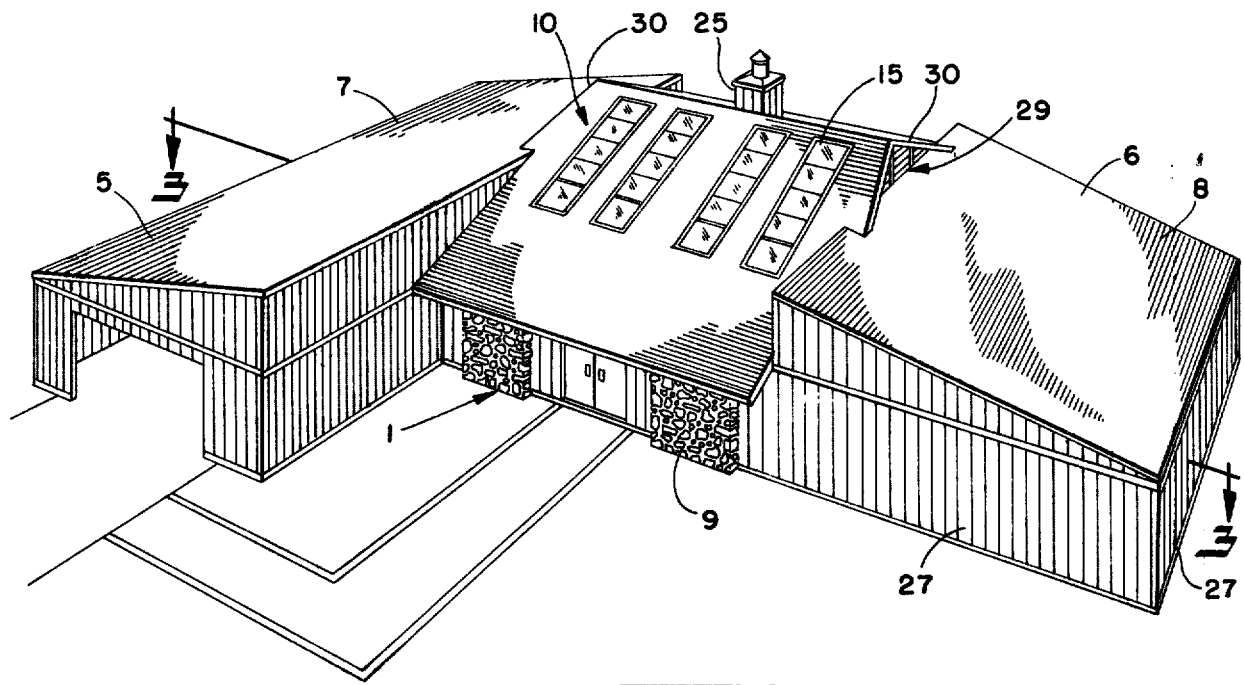
FIG. 1 is a schematic perspective view of one form of building structure constructed in accordance with the present invention.
Figure 2:
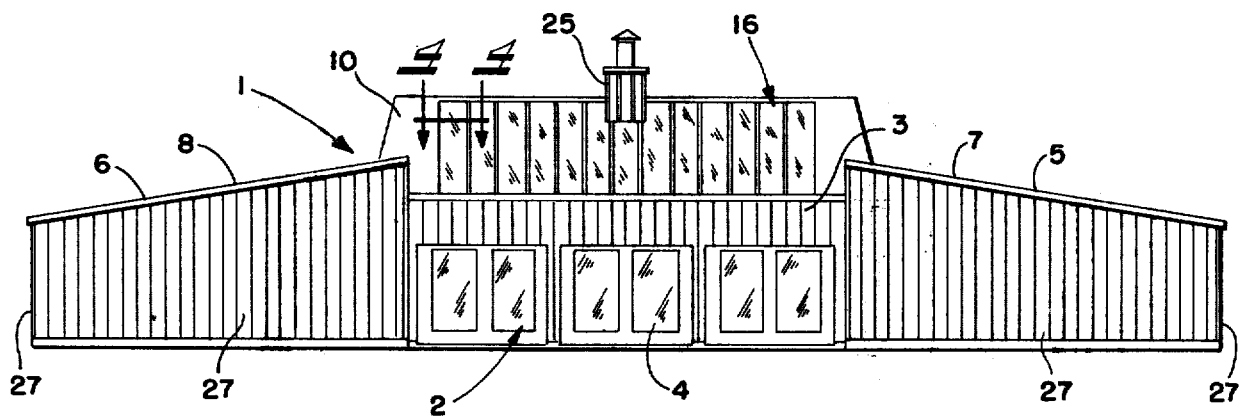
FIG. 2 is a rear elevation view of the building structure of FIG. 1.

The particular building structure 1 illustrated by way of example is generally in the shape of a U, providing a central outdoor patio or court area 2 enclosed along three of its sides by the walls of the house and along the fourth side by an insulated wall 3 having large glass portions 4 which may be opened or removed for a purpose to be subsequently described. The two wings or sides 5 and 6 of the house 1 may have separate roof portions 7 and 8, respectively, whereas the connecting portion 9 of the house between the two sides and the patio area 2 may be covered by a single gable roof 10 as clearly shown in FIG. 1.

Substantial portions 15 and 16 of the gable roof 10 over the outdoor patio area 2 are glass or other transparent material to provide for the solar heating of the patio area enclosed under the roof, thereby minimizing the loss of heat through the walls 17, 18 and 19 of the house exposed to the patio area. Moreover, since a major source of heat loss from any building structure is through the exterior glass area, a substantial savings in the heat loss may be obtained by locating most or all of the exterior glass area 20 along the walls 17, 18 and 19 of the structure which define the patio area 2 where the interior and exterior temperature differential is minimized due to the heating effects of the solar energy on the patio area. This may be done with little or no sacrifice to natural lighting or outdoor viewing, and in fact in many instances such natural lighting and outdoor viewing may be enhanced by providing a greater concentration of glass area 20 along the exterior walls 17, 18 and 19 exposed to the patio area than would normally be provided without sacrificing any heat loss. Since heat loss is a direct function of temperature difference, the solar heating effects on the outdoor patio area 2 will greatly reduce the amount of heat loss through the exterior glass area 20. Indeed, a heat gain to the interior will occur if the temperature within the enclosed patio area rises above the interior temperature, which is a distinct possibility on a good solar day even during quite cold weather.

During the night or on extremely cold days, supplemental heating for the interior of the structure may still be obtained from the patio area 2 by providing a fireplace 21 and/or potbellied stove 22 in the patio area. There are also other benefits which may be obtained from a patio fire. For instance, a patio fire may be used for outdoor cooking virtually any time of the year, and there are also the psychological benefits obtained from a patio fire which is visible from almost every room in the house. Having a fire in the patio rather than in a fireplace in the house also eliminates the disadvantages of an indoor fire, including its unbalancing effect on the heating system of the house and the heat loss caused thereby. A patio fire is also safer than an indoor fire because of the latter's closer proximity to combustible materials. A chimney or vent pipe 25 extending through the patio roof 10 is needed to vent a patio fire.

Many benefits other than a reduction in heat loss from the house interior may also be derived from a solar heated patio. Not only does the patio give the house a more open, outdoor atmosphere, it is also readily accessible from virtually every room in the house by providing sliding glass doors 26 or the like for each room facing the patio. Moreover, the patio may be used for various outdoor patio activities substantially the year around, and flowers and other plants may also be grown and maintained in the solar heated patio the year around.

While it is preferable not to have any glass areas in the exterior walls 27 of the structure not exposed to the patio area 2 as shown, it will be apparent that such additional glass areas may be provided if desired with some sacrifice in heat loss. Moreover, while the particular location of the solar heated patio in the house design shown in this application has substantial advantages in providing solar heat and amenity characteristics, it will be apparent that the same principles may be applied to a wide variety of house plans, and may also be readily adapted to buildings of two or more stories if desired.

Figure 4:
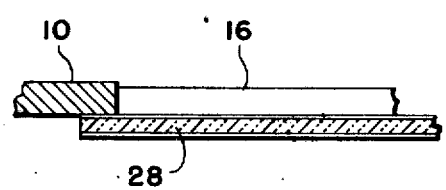
FIG. 4 is a partial section through one of the glass panels in the patio roof showing an insulating panel in place, taken on the plane of the line 4—4 of FIG. 2.

For each building configuration and location, calculations and tests will be required to determined the amount of transparent area 15, 16 in the roof 10 necessary to produce the desired solar heat gain in the patio area 2 during cold weather. Moreover, insulating panels 28 or the like may be used to cover the glass area as schematically shown in FIG. 4 when the sun is not shining during cold weather and also during warm weather to keep the patio area cool. Also during warm weather the glass doors or windows 4 in the insulated wall 3 of the patio area 2 and the large louvers 29 in the gable ends 30 of the glass covered area may be opened to create in conjunction with the vented openings at the bottom of the front roof slope glass area a chimney action inside the patio to continuously remove excess heat during the summer. Moreover, since the glass area 20 along the exterior walls 17, 18 and 19 exposed to the patio area are normally not exposed to direct sunlight, the average conditions contributing to heat gain to the interior of the structure are reduced both in respect to direct radiation and air temperature, thereby aiding cooling in the same but reversed manner as the heating.

The effects of the solar heat in assisting in maintaining the desired room temperature in the structure will be most noticeable in the fall and spring and should be sufficient to supply substantially all of the heat necessary to maintain the entire interior of the house at the desired room temperature when the outdoor temperature is in the 40° to 60°F. range. The solar heat absorbed during the day by the concrete, stone, and other objects in the patio area 2 will also assist in maintaining the interior temperature at the desired level during the nighttime which may be supplemented by moderate use of the fireplace or potbellied stove in the patio area at night and during very cold weather. Using dark colors in the patio area will also increase the amount of heat absorption in the patio area during the day for use in maintaining the interior room temperature at night. Of course, when the interior temperature drops below a predetermined level, the interior house heating system will come on to provide whatever supplemental heat is needed to maintain the interior temperature at the desired level.

While an important function of the solar heated patio area is to provide assistance in heating the interior of the structure or minimize the heat loss therefrom during cold weather, it may also be used as a sheltered and screened patio area for outdoor patio activities substantially the year around. The patio area is free from rain and insects in warm weather while still providing an outdoor feeling, and is directly viewable and readily accessible from virtually every room. Moreover, a patio fire not only has the functional value of providing heating assistance and permitting outdoor cooking, but it also provides the psychological benefits of a fireplace in a house without the aforementioned disadvantages of conventional indoor fireplaces.

The embodiments of the invention in which an exclusive property or privilege is claimed are defined as follows:

1. A building structure having plural exterior walls providing interior space bounded by said exterior walls, and a separate enclosed area exterior of said interior space bounded by at least two of said exterior walls, said enclosed area having a roof at least portions of which are transparent to permit passage of solar energy therethrough for heating said enclosed area, and said exterior walls bounding said enclosed area having substantial glass areas providing natural lighting and outdoor viewing from said enclosed area to said interior space, said solar heated enclosed area minimizing the heat loss from said interior space through said glass areas.

2. The structure of claim 1 wherein the other exterior walls of said structure not bounding said enclosed area are substantially windowless to minimize the heat loss from said interior space through said other exterior walls.

3. The structure of claim 1 wherein substantially all of the interior space of said structure has at least one exterior wall bounding said enclosed area containing substantial glass areas to obtain natural lighting and permit outdoor viewing from substantially anywhere within said interior space while minimizing the heat loss from said interior space through the glass areas.

4. The structure of claim 3 wherein said interior space is divided into plural rooms, and said glass areas in said exterior walls bounding said enclosed area include plural glass doors providing ready access to said enclosed area from substantially every room.

5. The structure of claim 1 further comprising supplemental heating means in said enclosed area for use in heating said enclosed area during poor solar days and at night in cold weather.

6. The structure of claim 1 wherein said interior space is divided into plural rooms, and there is a fireplace in said enclosed area visible through the glass areas in the exterior walls bounding said enclosed area from substantially every room.

7. The structure of claim 6 wherein said enclosed area, in addition to minimizing the heat loss from said interior space through the glass areas in said exterior walls bounding said enclosed area, also provides a patio usable substantially the year around, said patio being both visible and accessible from substantially every room.

8. The structure of claim 1 which is generally U-shape including a central portion and two sides bounded by said exterior walls, said enclosed area being enclosed along three of its sides by said exterior walls of said central portion and two sides.

9. The structure of claim 8 wherein said roof for said enclosed area also covers said central portion of said structure.

10. The structure of claim 9 wherein said roof for said enclosed area is a gable roof including opposite sloping sides each having substantial transparent areas overlying said enclosed area, and the ends of said gable roof have vents therein for venting said enclosed area during warm weather.

11. The structure of claim 9 wherein said roof for said enclosed area is a gable roof including opposite sloping sides each having substantial transparent areas overlying said enclosed area, and at least one of said sloping sides of said gable roof has vents therein for use in removing excess heat from said enclosed area during warm weather.

12. The structure of claim 8 wherein substantially only the exterior walls bounding said enclosed area contain any glass areas to minimize the heat loss from said interior space through said glass areas with little or no sacrifice to natural lighting of said interior space and outdoor viewing from said interior space.

13. The structure of claim 1 wherein said enclosed area has an exterior wall not bounding said interior space containing substantial glass areas which may be opened to vent said enclosed area during warm weather.

14. The structure of claim 1 further comprising removable insulating panels for covering said transparent portions in said roof to assist in keeping said enclosed area cool during warm weather and minimize the heat loss from said enclosed area through said transparent portions during cold weather when the sun is not shining.

15. The structure of claim 1 further comprising an interior heating system in said interior space for providing supplemental heat to said interior space when the temperature in said interior space drops below a predetermined level.

* * * * *